United States Patent [19]

Wimmer

[11] Patent Number: 4,893,646
[45] Date of Patent: Jan. 16, 1990

[54] FLUID PRESSURE REGULATOR

[75] Inventor: Guenther W. Wimmer, Portland, Oreg.

[73] Assignee: Tektronix, Inc., Beaverton, Oreg.

[21] Appl. No.: 187,666

[22] Filed: Apr. 28, 1988

[51] Int. Cl.⁴ ............................................. G05D 16/20
[52] U.S. Cl. ................................. 137/487.5; 137/115
[58] Field of Search ............ 137/115, 528, 529, 487.5, 137/116, 538; 251/65

[56] References Cited

U.S. PATENT DOCUMENTS

| | | | |
|---|---|---|---|
| 1,454,409 | 5/1923 | Richter | 137/538 X |
| 2,219,441 | 10/1940 | Carnes | 137/529 U X |
| 2,402,499 | 6/1946 | Lawrence | 137/115 X |
| 2,667,895 | 2/1954 | Pool et al. | 137/528 |
| 2,700,395 | 1/1955 | Young | 137/529 X |
| 3,397,717 | 8/1968 | Tenkku et al. | 137/529 |
| 3,908,688 | 9/1975 | Gandrud | 137/115 X |
| 4,417,312 | 11/1983 | Cronin | 137/487.5 X |
| 4,488,574 | 12/1984 | Bartholomäus | 137/487.5 |
| 4,548,233 | 10/1985 | Wolfges | 137/529 |
| 4,796,661 | 1/1989 | Hishinuma et al. | 137/487.5 |

FOREIGN PATENT DOCUMENTS

| | | | |
|---|---|---|---|
| 331942 | 8/1958 | Switzerland | 137/487.5 |
| 1145195 | 3/1985 | U.S.S.R. | 137/115 |

Primary Examiner—Stephen M. Hepperle
Attorney, Agent, or Firm—John Smith-Hill; Robert S. Hulse

[57] ABSTRACT

A fluid pressure regulator comprises a housing defining a cylindrical chamber; an inlet opening for introducing fluid under pressure into the chamber, an outlet opening for allowing fluid to leave the chamber at a regulated pressure, and a bleed orifice in communication with a space at constant pressure. The outlet opening and the inlet opening are in open communication. A ferromagnetic piston member is fitted in the chamber and is slidable within a range of positions such that the bleed orifice is partially covered by the piston. The ferromagnetic piston member is biased at a substantially constant force when it is that range of positions.

8 Claims, 1 Drawing Sheet

FLUID PRESSURE REGULATOR

BACKGROUND OF THE INVENTION

This invention relates to a fluid pressure regulator.

In an air assisted ink jet head, such as described in U.S. Pat. No. 4,613,875 issued Sept. 23, 1986, air is delivered under pressure to the ink jet head and forms a stream of air which assists in detaching ink droplets from an aperture plate in the ink jet head. In order to provide consistent copy quality, it is necessary that the pressure with which air is supplied to the ink jet head be regulated. If more that one type of print receiving medium is used, e.g. not only paper but also transparent film, it may be necessary for optimal operation of the ink jet head, to employ regulated pressures of different magnitudes with the media respectively.

The Tektronix 4692 color copier employs air assisted ink jet heads and has a pressure regulator that comprises a housing defining a cylindrical chamber. The housing also defines an inlet opening for introducing fluid under pressure into the chamber, and an outlet opening for allowing air to leave the chamber at a regulated pressure. The housing further defines two bleed orifices which are spaced apart from each other and from the outlet opening in a direction along the central axis of the cylindrical chamber. The bleed orifice that is axially closer to the outlet opening is provided with a valve, whereby this orifice can be opened or closed selectively. A piston is fitted in the chamber and is movable between a first position in which both bleed orifices are in open communication with the inlet and outlet openings and a second position in which the bleed orifices are effectively isolated from the inlet and outlet openings. A spring biases the piston towards the second position. When air under pressure is supplied to the outlet opening and the valve is open, the piston tends to an equilibrium position in which it partially closes the first bleed orifice. Similarly, when the valve is closed, the piston tends to an equilibrium position in which it partially closes the second bleed orifice. The difference between pressure that exists in the chamber when the valve is open and that which exists when the valve is closed is a function of the area of the piston, the spring constant and the axial distance between the bleed orifices.

SUMMARY OF THE INVENTION

A preferred embodiment of the present invention is a fluid pressure regulator which comprises a housing defining a cylindrical chamber, an inlet opening for introducing fluid under pressure into the chamber, an outlet opening for allowing fluid to leave the chamber at a regulated pressure, and a bleed orifice in communication with a space at constant pressure. The outlet opening and the inlet opening are in open communication. A ferromagnetic piston member is fitted in the chamber and is slidable within a range of positions such that the bleed orifice is partially covered by the piston. Adjustable magnetic means bias the ferromagnetic piston member at a substantially constant force when it is in the aforesaid range of positions.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
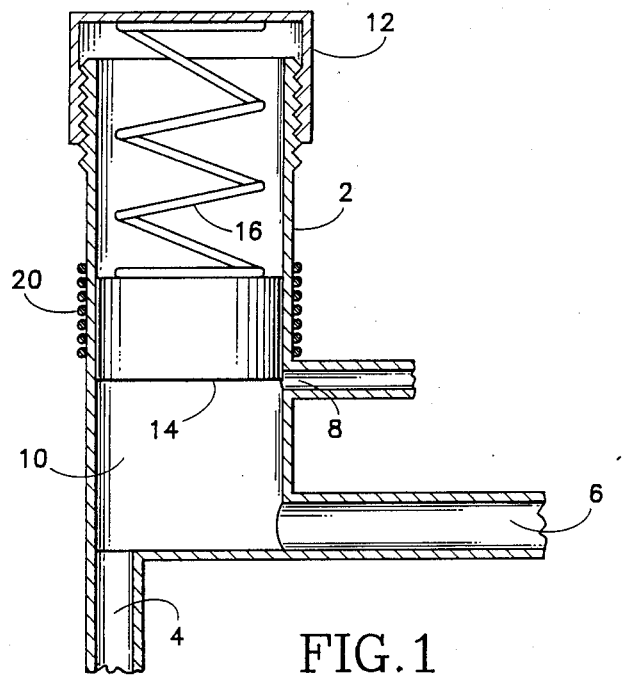
FIG. 1 is a sectional view of an air pressure regulator embodying the present invention.
Figures 2, 3:
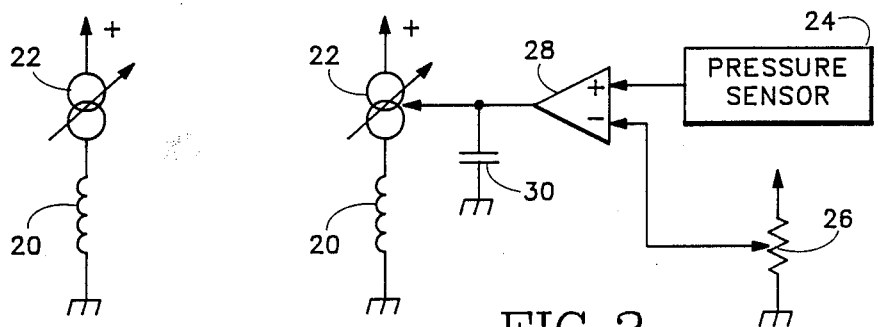
FIG. 2 is a schematic of a first circuit for adjusting the set point of the pressure regulator.
FIG. 3 is a schematic of a closed-loop regulating system including the FIG. 1 regulator.

The air pressure regulator shown in the drawings comprises a housing 2 of dielectric material having an inlet opening 4, an outlet opening 6 and a bleed orifice 8. The inlet opening is connected to a supply 7 of air under pressure, e.g. a pump, a filter and an accumulator. The outlet opening is connected to a consuming device 9, such as an air-assisted ink jet head, which requires a supply of air at a constant pressure below that at which air is normally supplied to the inlet opening and above ambient atmospheric pressure. The bleed orifice is connected to a space at constant pressure below the pressure required by the consuming device. For example, the bleed orifice may be connected to the ambient atmosphere. The housing defines a cylindrical chamber 10. At its upper end, the housing is provided with a cap 12 which is in threaded engagement with the housing. A piston 14 made of, or incorporating, ferromagnetic material is fitted slidably in the chamber, and a compression spring 16 is effective between the piston 14 and the cap 12. A helical coil 20 coaxially surrounds the housing and has its terminals connected to a current source 22 (FIG. 2). When the coil is energized, it is in magnetically coupled relationship with the piston. The pressure that is established in the chamber when the piston is at the level of the bleed orifice then depends not only on the spring constant and the degree of compression of the spring but also on the current supplied to the coil. If the supply pressure increases, the pressure in the chamber 10 tends to increase and the piston 14 is pushed against the force of the spring 16, uncovering a greater area of the orifice 8. Conversely, if the supply pressure decreases, the area of the orifice 8 that is covered decreases. The pressure in the chamber 10, and consequently the pressure with which air is supplied through the outlet opening 6, is thus stabilized. By adjusting the current, the pressure at the outlet opening can be adjusted.

The coil is designed so that, at a given current, and within the range of movement of the piston such that the bleed orifice is partially, but not fully, covered, the magnetic force applied to the piston is essentially constant. Therefore, at a given pressure the position of the piston modulates the orifice size such that surplus air volume is bled off.

The coil 20 may be connected to a current source 22 in an open loop system, as shown in FIG. 2. If the current source is stable, the current through the coil 20 will remain constant and accordingly the pressure in the chamber 10 will remain constant. The current source 22 may be an adjustable current source, as shown, so that the pressure in the chamber 10 can be adjusted. For example, the current source may be designed to provide current at one of two or more predetermined levels. Alternatively, if adjustment of the current level is not required, the current source may be a constant current source.

FIG. 3 illustrates a closed-loop regulating system. The current level provided by the current source 22 is controlled in response to the output signal provided by a differential amplifier 28, integrated by a capacitor 30. A pressure sensor 24, which senses the pressure at a point downstream of the chamber 10, provides one input to the differential amplifier 28, and a potentiometer 26 provides the other input to the differential amplifier. The output voltage provided by the pressure sensor tends to converge to the voltage level provided by the potentiometer 26.

It will be appreciated that the present invention is not restricted to the particular embodiment that has been described and illustrated, and that variations may be made therein without departing from the scope of the invention as defined in the appended claims and equivalents thereof. For example, although in the illustrated embodiment of the invention the spring 16 establishes a base point pressure, and the current supplied to the coil 20 establishes an offset from the base point pressure, the spring could be eliminated and the magnetic force exerted on the piston 14 by energization of the coil 20 used alone to establish the pressure in the chamber 10. Also, it is not essential to the invention that the piston 14 be made of ferromagnetic material: the piston might carry a rod extending coaxially with the chamber 10 and having a body of ferromagnetic material at its end opposite the piston 14, with the coil 20 in magnetically-coupled relationship with the body of ferromagnetic material. Alternatively, such a rod, which moves with the piston might carry the coil 20 at its end opposite the piston 14, with the coil being disposed in magnetically-coupled relationship with a stationary body of electromagnetic material. Of course, this latter construction is subject to disadvantage in that it is necessary to accommodate movement of the coil. Moreover, although the invention has been described with reference to an air pressure regulator, it is also applicable to regulating the pressure of other gases or of liquids.

I claim:

1. A fluid pressure regulator comprising:
   a housing defining a cylindrical chamber, an inlet opening for introducing fluid into the chamber, an outlet opening for allowing fluid to leave the chamber, the outlet opening being in open communication with the inlet opening, and a bleed orifice in communication with a space at constant pressure,
   a source of fluid under pressure connected to the inlet opening,
   a piston member of ferromagnetic material fitted in the chamber and slidable therein within a range of positions such that the bleed orifice is partially covered by the piston member, and
   magnetic means which bias the piston member at a substantially constant force when it is within said range of positions, the magnetic means comprising an electrical conductor having first and second opposite terminals and a current source connected to said terminals for supplying a flow of current through the conductor.

2. A fluid pressure regulator according to claim 1, further comprising a spring which urges the piston member towards a position in which the bleed orifice is effectively isolated from the inlet and outlet openings.

3. A fluid pressure regulator according to claim 1, wherein the conductor is in the form of a coil which coaxially surrounds the housing.

4. A fluid pressure regulator according to claim 1, comprising means for sensing the pressure at which fluid leaves the chamber, and means for adjusting the current supplied by the current source in response to the pressure sensed by the pressure sensor.

5. In combination, a source of fluid under pressure, a consuming device for consuming the fluid under pressure, and a fluid pressure regulator for controlling supply of fluid under pressure from the source to the consuming device, said fluid pressure regulator comprising:
   a housing defining a cylindrical chamber, an inlet opening connected to the source of fluid under pressure for introducing fluid into the chamber, an outlet opening in open communication with the inlet opening and connected to the consuming device for supplying a flow of fluid to the consuming device, and a bleed orifice in communication with a space at constant pressure,
   a piston member fitted in the chamber and slidable therein within a range of positions such that the bleed orifice is partially covered by the piston member,
   magnetic means which bias the piston member at a substantially constant force when it is within said range of positions, the magnetic means comprising an electrical conductor having first and second opposite terminals and a current source connected to said terminals for supplying a flow of current through the conductor,
   means for sensing the pressure at which fluid leaves the chamber, and
   means for adjusting the current supplied by the current source in response to the pressure sensed by the pressure sensor.

6. A combination according to claim 5, wherein the piston member is made of ferromagnetic material and is in magnetically coupled relationship with the magnetic means.

7. A combination according to claim 5, further comprising a spring which biases the piston member towards a position in which the bleed orifice is effectively isolated from the inlet and outlet openings.

8. A combination according to claim 5, wherein the piston member is made of ferromagnetic material and the conductor is in the form of a coil which coaxially surrounds the housing.

* * * * *